B. D. WILLIS.
TELEPHONE RECEIVER.
APPLICATION FILED OCT. 28, 1908.
1,180,462. Patented Apr. 25, 1916.
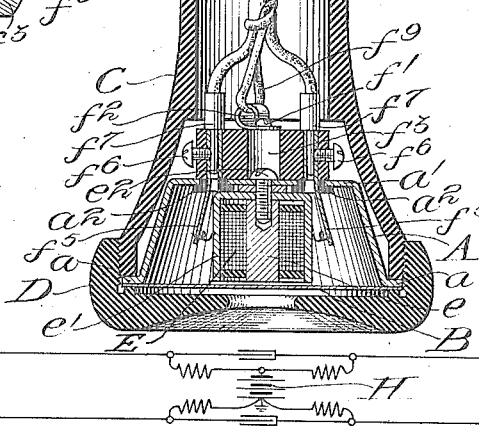
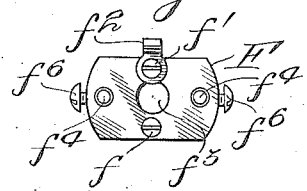
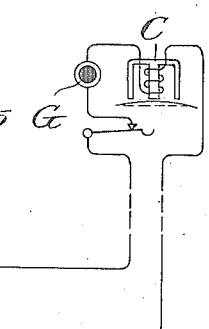
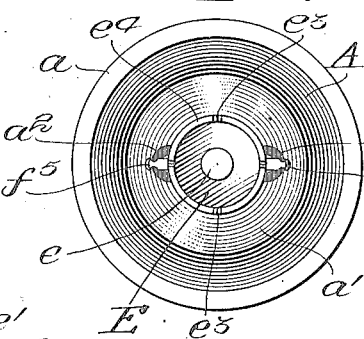
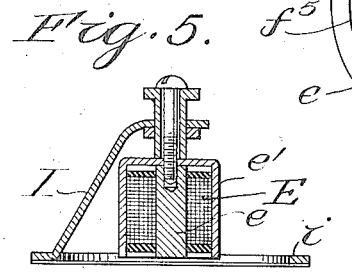
Witnesses.
R. H. Binfeind
W. L. Campbell
Inventor:
Bernard D. Willis
By Bulkley Durand & Drury.
Attorneys.

UNITED STATES PATENT OFFICE.

BERNARD D. WILLIS, OF CHICAGO, ILLINOIS, ASSIGNOR TO AUTOMATIC ELECTRIC COMPANY, OF CHICAGO, ILLINOIS, A CORPORATION OF ILLINOIS.

TELEPHONE-RECEIVER.

1,180,462. Specification of Letters Patent. Patented Apr. 25, 1916.

Application filed October 23, 1908. Serial No. 459,840.

*To all whom it may concern:*

Be it known that I, BERNARD D. WILLIS, a citizen of the United States of America, and resident of Chicago, Cook county, Illinois, have invented a certain new and useful Improvement in Telephone-Receivers, of which the following is a specification.

My invention relates to telephone receivers—that is to say, the instruments which are held to the ear to enable the listener to hear the voice or other vibrations transmitted from the other end of the circuit. In the use of devices of this kind it has been the general practice to employ permanent magnets for polarizing the same, and to provide electromagnet coils in conjunction therewith for influencing the diaphragm of the receiver. With receivers of this character it has also been the general practice to exclude the coils of the receiver from the path of battery current—that is to say, to so arrange the circuits that no battery current will flow through the coils which operate the diaphragm. If battery current was permitted to pass through the said coils, provision has always been made for preventing such flow of current from energizing the magnet, and, furthermore, any flow of battery current in the diaphragm coils has always been in combination with a permanent magnet, at least so far as I am now aware. In the actual operation of telephone exchanges the foregoing has, therefore, been the general practice.

The object of my invention is, therefore, the provision of a commercially useful and highly efficient telephone receiver in which there is no permanent magnet, and in which the coils for operating the diaphragm are connected directly in series with the transmitter, thus utilizing the flow of battery current for attracting the diaphragm of the receiver and insuring as good results, from a practical and commercial standpoint, as would ordinarily be obtained by the use of a receiver having a permanent magnet.

It is also an object to provide certain details and features of improvement tending to increase the general efficiency and serviceability of a telephone receiver of this particular character.

To the foregoing and other useful ends, my invention consists in matters hereinafter set forth and claimed.

In the accompanying drawings Figure 1 is a longitudinal section of a telephone receiver embodying the principles of my invention. Fig. 2 is a detail view of the mounting or connection fitting by which the circuit conductors are connected with the coils of the receiver. Fig. 3 is an enlarged perspective view of the soft iron cup that forms one pole of the electromagnet. Fig. 4 is an end elevation or face view of the receiver, with the diaphragm thereof removed, showing the central and concentric arrangement of the electromagnet and poles thereof relative to the center of the end of the receiver. Fig. 5 is a detail sectional view illustrating a modified form of the construction shown in Fig. 1. Fig. 6 is a diagram of a telephone circuit illustrating the manner in which my improved receiver may be connected in the line in series with the transmitter in a common battery system.

As thus illustrated, and referring more particularly to Figs. 1 to 4, inclusive, it will be seen that my invention comprises a brass cup A having a flange or perimeter $a$ that forms a seat or marginal bearing for the diaphragm B, said cup being slightly flaring in form. The said flange $a$ is adapted to engage the circular end edge of the receiver casing C, and the diaphragm and cup are clamped in place thereon by means of the usual apertured cap D, which latter is adapted to screw upon the open end portion of the said casing, both the casing and cap being preferably made of rubber vulcanite. The said cup has its smaller end or bottom wall $a'$ provided with two apertures arranged preferably at opposite sides of the center thereof and provided with insulating bushings $a^2$, thus providing insulated apertures in the back or bottom of the cup. The electromagnet E has a cylindric core $e$ upon which is mounted the winding or coil of the magnet, and to the rear end of which is secured the bottom of a soft iron cup $e'$, which cup forms a shell for the coil or winding of the magnet. The electromagnet thus formed is secured to the back or bottom of the brass cup A by means of a screw $e^2$, which latter extends through a central opening in the said brass cup, through a central opening in the soft iron cup $e'$, and then into a threaded opening or socket in the end of the core $e$, a small washer being preferably interposed between the backs or bottoms of the two cups. In this way the electromagnet is firmly clamped in place at the center of the brass cup A and centrally of the diaphragm of the receiver. The cup $e'$ is preferably formed with longitudinal slots $e^3$, which slots divide the cylindric sides of the cup into four portions which are separated at their outer ends but united at their other ends through the medium of the back or bottom of the cup. It will be seen that the semi-circular or segmental pole pieces $e^4$ are arranged concentrically in a circle around the outer end of the core $e$, and that consequently both poles of the electromagnet are in juxtaposition to the back of the diaphragm, so that the magnetic circuit is closed through the latter when the magnet is energized by a flow of electrical current therein. One pole of the magnet is at the exact center of the diaphragm, and the other pole of the magnet acts on the diaphragm along the line of a circle extending concentrically around the other pole, whereby a centralized and uniform magnetic action is exerted upon the diaphragm. To the back of the brass cup A there is secured a block of insulation or mounting F, the same being held in place by screws $f$, $f'$ inserted therethrough and into the back or bottom of the brass cup. A hook or hitching post $f^2$ is secured in place by the screw $f'$ upon the top or outer surface of the block F, and the latter is provided with a central opening $f^3$ that affords access to the screw $e^2$, whereby the electromagnet can be detached from the brass cup. Brass terminal pieces or binding posts $f^4$ are inserted through the block F and provided with projecting portions $f^5$ that extend through the bushings $a^2$ and into the interior of the brass cup, where they are then suitably connected with the terminals of the coil or winding of the electromagnet. These binding posts $f^4$ are provided with clamping screws $f^6$, and each post is adapted to receive one of the cord terminals or plugs $f^7$ that form the terminals of the flexible cord $f^8$ extending rearwardly through the casing of the receiver, in the ordinary and well-known manner. The said cord has a loop or attaching portion $f^9$ that engages the hitching post $f^2$, whereby the weight of the receiver is not sustained by the terminal portions $f^7$, but instead by a special or separate connection with the cord.

Referring to Fig. 6 it will be seen that the receivers C are here shown diagrammatically and in series with the transmitters G in a common battery system. As shown, the current from the central battery H is supplied over the line circuit and passes to the transmitters and receivers at the substations, whereby as soon as the line circuit is closed the diaphragms of the receivers are placed under a stress or tension as a result of the energizing of the electromagnets of the said receivers. In this way no permanent magnets are necessary for the receivers, as both the battery and the voice-currents traverse the coils or windings by which the diaphragms of the receivers are actuated.

In Fig. 5 the construction is substantially the same as that shown in Fig. 1 except that the electromagnet and its cup are adjustably secured to a brass arm I, instead of to the bottom of the brass cup, said arm being integral with the brass ring $i$ which forms a seat or marginal bearing for the diaphragm.

The receiver thus constructed embodies a single electromagnet having a straight core, one pole of which is disposed at and just out of contact with the center of the diaphragm, and the other or remote pole of which is provided with a cup-shaped pole piece disposed in position to act on the diaphragm along the line of a circle extending concentrically around the center thereof. Furthermore, this circular pole of the magnet is broken up into segments or sections which are preferably equal in length. I find that this construction of cup gives the best results, although, obviously, for the broader purposes of my invention the magnet may have its rear end provided with a pole piece of any suitable form or character.

A receiver of the foregoing character has many advantages. As there is no permanent magnet the casing can be made smaller than heretofore, and can be shaped in various ways, depending upon the style of telephone apparatus in connection with which it is to be used. Furthermore, it involves less metal and is consequently lighter than the old style of receiver, notwithstanding that in actual practice it is found to be fully as efficient, at least as far as the receiving qualities thereof are concerned.

What I claim as my invention is:—

1. A telephone receiver of the direct battery type having a diaphragm, a diaphragm support, a shell and cap to hold said support and diaphragm together, an insulating member removably mounted on the outside face of said support, connectors mounted upon said member, an electromagnet mounted and having its magnetic circuit wholly within said diaphragm support, means for holding said electromagnet in place, and an opening through said insulating member to receive said magnet holding means.

2. A telephone receiver of the direct battery type having a diaphragm, a diaphragm support, a shell and cap to hold said support and diaphragm together, an insulating member removably mounted on the outside face of said support, connectors mounted upon said member, an electromagnet mounted with said diaphragm and support, and a continuous section of the receiver core projecting through said insulating member to hold said electromagnet in place.

Signed by me at Chicago, Cook county, Illinois, this 24th day of October, 1908.

BERNARD D. WILLIS.

Witnesses:
J. NORBY,
E. CLEGG.